GENERATION AND USE OF CONTROL SIGNAL IN SUPERREGENERATIVE RECEIVERS

Filed May 3, 1962

INVENTORS
JACK R. HARRIS
RAY P. MURRAY
BY Paul M. Klein Jr.
ATTORNEY

United States Patent Office 3,199,031

Patented Aug. 3, 1965

3,199,031
GENERATION AND USE OF CONTROL SIGNAL IN SUPERREGENERATIVE RECEIVERS

Jack R. Harris, United States Navy (3026 Flagler Ave., Key West, Fla.), and Ray P. Murray, 28 Sierra Vista Drive, Monterey, Calif.

Filed May 3, 1962, Ser. No. 192,290
12 Claims. (Cl. 325—429)
(Granted under Title 35, U.S. Code (1952), sec. 266)

Figures 1, 2:
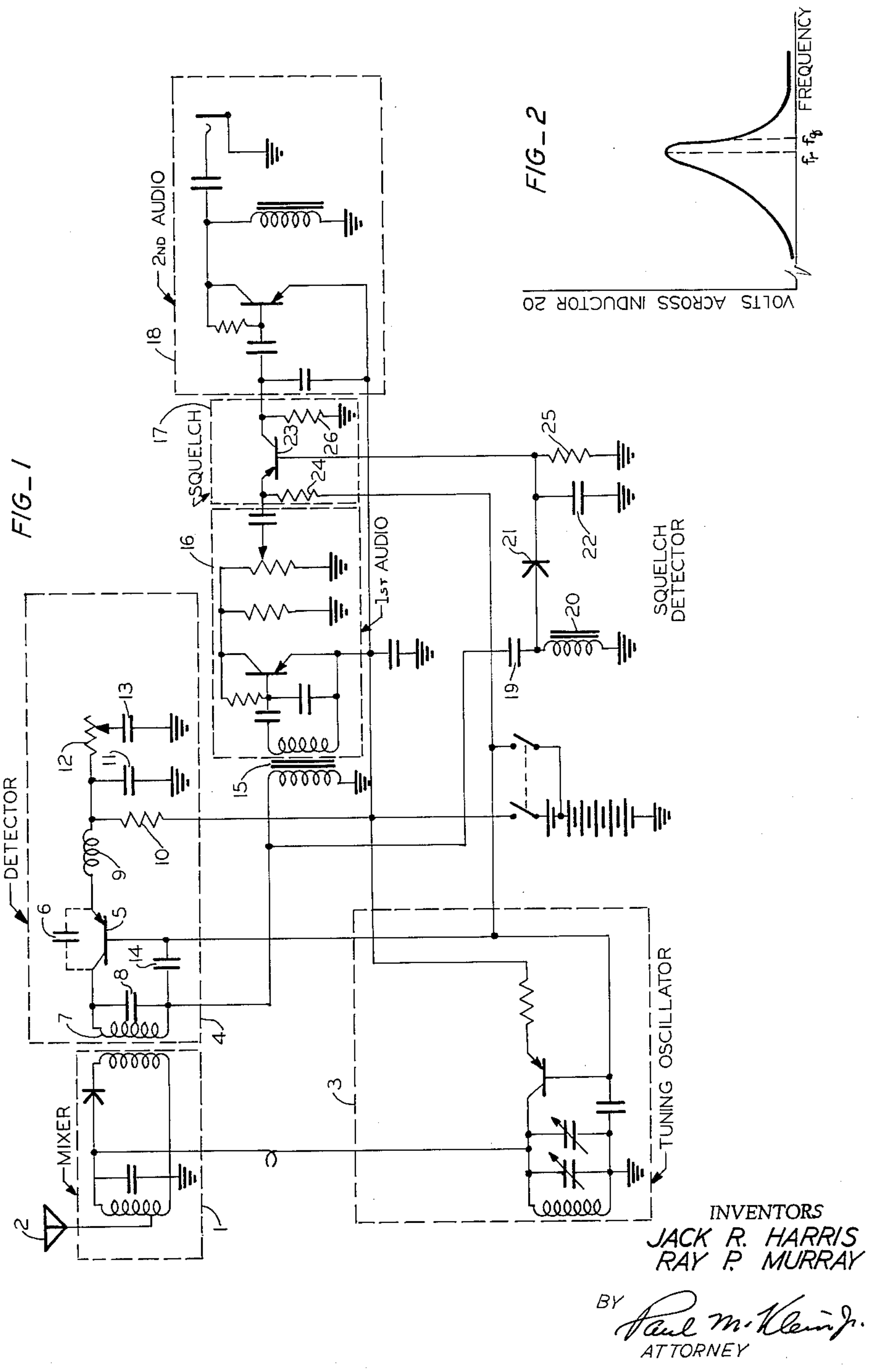

The invention described herein may be manufactured and used by and for the Government of the United States of America for governmental purposes without the payment of any royalties thereon or therefor.

This invention relates to the generation and use of a control signal in superregenerative receivers and more particularly to superregenerative radio receivers with squelch.

The tremendous sensitivity of the superregenerative detector is well known, but its usefulness has been quite limited because of the characteristic hiss which is present in the absence of a received signal. In the prior art, control signals have been developed from a superregenerative detector by means of sensing a variation in some parameter of the detector as the incoming signal is received. As evidenced in U.S. Patent Number 2,584,132, for example, it is known that the quench frequency is a function of the incoming signal. The operating point current and voltage, and the noise output of the detector are also known to be functions of the incoming signal.

In the prior art certain of these variables have been sensed to produce a signal for operating a switch for the purpose of muting the audio section of the receiver when no incoming signal is present. However, in the prior art the variation in quench frequency has not been used for this purpose. Furthermore, in the prior art, the control signal has been developed at the expense of fairly complicated electronic circuitry which reduces the advantage of the superregenerative receiver over the more conventional type.

It is an object of this invention to provide a superregenerative radio receiver, including an audio section, in which a control voltage, used to disable the audio section for squelch, is developed by sensing the quench frequency shift by means of a simple inexpensive circuit which can make the receiver much more competitive.

Other objects and many of the attendant advantages of this invention will be readily appreciated as the same becomes better understood by reference to the following detailed description when considered in connection with the accompanying drawings wherein:

FIG. 1 is a schematic diagram of a preferred embodiment of this invention in the form of a transistor type radio receiver using a self-quenched superregenerative detector embodying the squelch circuit of this invention; and FIG. 2 is a portion of the resonance curve of the quench voltage step-up circuit of the invention showing the relation between the resonant frequency and the quench frequency.

While the prior art has used active devices such as tubes to help develop the control signal, this invention uses a simple series LC circuit, composed of only passive devices, as a combined quench voltage step-up circuit and quench frequency discriminator. Further, the adjustment of the squelch action is accomplished without the tuning of the frequency discriminator circuit, but by means of a variable resistor which is used to adjust the quench frequency of the superregenerative detector. While this invention shows a self-quenched superregenerative detector, the separately quenched superregenerative detector can be used as well. Further, while this invention shows a transistor type of receiver, the invention also applies to systems using other types of active devices such as tubes and tunnel diodes.

Reference is now made to the drawing. Circuit 1 of FIG. 1 is a mixer which may receive an incoming signal from the antenna 2, and also a signal, coupled by means of the gimmick shown, from the local oscillator 3, and by means of conventional superheterodyne action, translate the incoming signal to an intermediate frequency. This intermediate frequency can be considered as the desired incoming signal to the superregenerative detector circuit 4.

In the detector circuit 4, the feedback between collector and emitter of transistor 5 is by means of capacitor 6 which is shown dotted as it may be in whole or in part supplied by the transistor internal capacitance and wiring capacitance. Radio frequency oscillations occur at a frequency dependent primarily upon the tuned circuit comprised of inductor 7 and capacitor 8 which are resonant at a frequency corresponding to the frequency of the signal from the mixer. It should be noted that this invention is equally applicable to receivers in which the incoming signal is applied directly to the superregenerative detector from the antenna. The incoming signal, whether direct from the antenna or from the mixer, can be regarded as a radio frequency oscillation.

Inductor 9 is a radio frequency choke which keeps the emitter of transistor 5 above ground potential. Resistor 10 and capacitor 11 comprise an RC time constant circuit which causes the radio frequency oscillations to be interrupted at the quench frequency which is very much less than the frequency of the radio frequency oscillations, but considerably above the modulation frequency of the incoming signal. Variable resistor 12 and capacitor 13 provide a means of adjusting the quench frequency and, as will be shown, allows resistor 12 to be used as the squlech control which will determine the strength of the incoming signal required to operate the squelch switch.

Capacitor 14 acts as a radio frequency bypass capacitor and thus returns the cold end of the tuned circuit comprised of capacitor 8 and inductor 7 to the base of transistor 5. The output signal of the detector is passed through the primary of iron-core coupling transformer 15. This signal may be composed of a modulation signal from the incoming wave, a quench frequency component, a noise component, and a hiss component generated by the superregenerative detector. This signal is passed through audio amplifier 16, the squelch switch 17, and output audio amplifier 18. The quench frequency component is attenuated by means of low-pass filters in the audio amplifiers.

Now to be considered is the development of the control signal and its action on the squelch switch. It will first be assumed that no incoming signal is present. The output signal of the superregenerative detector is fed to a combined frequency discriminator and quench voltage step-up circuit comprised of capacitor 19 and inductor 20. The resonant frequency, $f_r$, of this circuit is slightly lower than the quench frequency, $f_q$, as shown in FIG. 2. $f_r$ is chosen so that the quench frequency appears on the steep section of the resonance curve. Although the illustrated embodiment is thus seen to use the fundamental component of the quench voltage, it is also possible to use a harmonic of the quench voltage. Thus, when the term "quench voltage" or the like is used in reference to this invention it should be understood to mean generally either the fundamental or a harmonic. Further, it is possible to operate the quench frequency on the other side of the resonance curve to obtain a control voltage which shifts oppositely.

The amplified quench voltage across inductor 20 is rectified by diode 21, smoothed by capacitor 22, and applied as a turn-off bias in the emitter-base circuit of squelch switch transistor 23, the total bias on this transistor being composed of this control voltage and a turn-on voltage produced by the battery supply and resistors 24 and 25. It should be noted that transistor 23 is, in fact, an amplifier but since it also serves as a switch as used in this invention it is deemed proper to refer to it as a squelch switch transistor. Resistor 26 is the collector load resistor for transistor 23. If the control voltage is small, then transistor 23 will be on and will pass the audio signal from audio amplifier 16 through to audio amplifier 18. This audio signal will be noise and hiss. In order to squelch this noise, the squelch control 12 is adjusted so as to decrease its resistance, thereby lowering the quench frequency, and as can be seen from FIG. 2, raising the amplitude of the quench voltage across inductor 20 and increasing the control voltage thereby turning off transistor 23 and muting the output noise. It is apparent that this arrangement for disabling the transmission of audio signal through the apparatus of FIG. 1 for receiving a communication signal accomplishes, continuously during the interval when communication signal is absent, not only the interruption of the communication signal, exemplified by audio signal, on its path to the loudspeaker or headphones but also essentially the interruption of current from the power supply, the battery, flowing through the power-consuming network comprised of transistor 23 and resistors 24 and 26. This reduces power consumption and extends the life of the battery by lowering the drain on it in the absence of signal.

With the receiver muted, consider the application of an incoming signal carrier. With the application of this carrier, the quench frequency increases and from FIG. 2 it can be seen that this reduces the amplitude of the quench voltage across inductor 20, and thus the control voltage is reduced allowing transistor 23 to be turned on, thus placing the audio amplifier in an operating condition for the modulation signals.

Various modifications can be made in the embodiment illustrated while still remaining with the concept of the invention. For example, although the transistor version is simple and does not consume an appreciable power, other active devices can be substituted for the transistors, for example, tubes in which the cathode, plate, and grid serve, respectively, as emitter, collector and control element. The quench voltage for supplying the combined discriminator and voltage step-up circuit 19, 20 is picked off from the detector circuit but it could also be obtained from the audio section. The amplified quench signal could be taken off across capacitor 19 but less difficulty with the audio component is encountered by using the illustrated embodiment.

The adjustment of the time constant circuit to vary the quench frequency could be accomplished by varying resistor 10, varying capacitor 11, varying capacitor 13, or omitting capacitor 13 and placing variable resistor 12 between capacitor 11 and the junction of inductor 9 and resistor 11. However, the illustrated embodiment yields the least expensive arrangement to give the best adjustment of the quench frequency without undesirable change of waveform. The electronic switch, shown as a transistor but obviously replaceable with a tube or the like, is illustrated as being located between the first and second audio stages but can be located in any other position in the audio section where it will prevent the undesired hiss from being heard. The capacitor 11 and the series RC combination 12, 13 are both shown as returned to the ground, representing the common return, exemplified customarily by the chassis which is usually a convenient point to reach. This manner of connection effectively places them at the quench frequency in parallel with resistor 10, which could as well be accomplished by returning them directly to the lower end of resistor 10.

Obviously many other modifications and variations of the present invention are possible in the light of the above teachings. It is therefore to be understood that within the scope of the appended claims the invention may be practiced otherwise than as specifically described.

What is claimed is:

1. A radio receiving system comprising an audio stage and a superregenerative detector adapted to receive an external signal; an active device for switching said audio stage on and off; means for sensing the shift in the quench frequency of said superregenerative detector; and means for causing said sensing means to operate said active device to switch said audio stage on and off in response to the shift in quench frequency occasioned by the presence and absence of said external signal, said last named means including means to maintain said audio stage switched off during the entire interval when said external signal is absent.

2. A radio receiving system comprising an audio stage and a superregenerative detector adapted to receive an external signal; an active device for switching said audio stage on and off; a combination frequency discriminator and step-up circuit for the quench frequency voltage of said superregenerative detector constituted of only passive circuit elements; means for supplying the amplified voltage from said quench frequency voltage step-up circuit to operate said active device to switch said audio stage to an on condition and an off condition in response to shift in quench frequency occasioned by the presence and absence of said external signal and to maintain said audio stage in one of said two conditions during the entire interval when said external signal is absent.

3. The system of claim 2 further including manually operable means for varying the quench frequency of said detector.

4. A radio receiving system comprising an audio stage and a superregenerative detector adapted to receive an external signal; a resistance-capacitance time constant circuit for determining the quench frequency of said superregenerative detector; a combined quench frequency discriminator and quench voltage step-up circuit made of only passive elements comprising a capacitor and an inductor in series; means for supplying the quench frequency voltage to said quench voltage step-up circuit; means for rectifying and smoothing the amplified quench voltage from said quench voltage step-up circuit; an electronic squelch switch controlling operation of said audio stage; means for applying the smoothed quench voltage from said smoothing means to said switch to disable said audio stage in the absence of said external signal; and manually operable means for varying the magnitude of a component of said time constant circuit to establish the quench frequency at a point on the resonance curve of said quench voltage step-up circuit which determines the strength of the incoming external signal necessary to operate said squelch switch.

5. The system of claim 4 wherein the means for rectifying is a diode.

6. A radio receiving system comprising an audio stage and a superregenerative detector adapted to receive an external signal, a quenching circuit having a capacitor effectively in parallel at the quench frequency with a resistor to form a time constant circuit causing the radio-frequency oscillations in the detector to be interrupted at the quench frequency; effectively in parallel at the quench frequency with said capacitor, a series combination of a capacitor and a variable resistor for adjusting the quench frequency; a series-connected capacitor and inductor serving as a combined frequency discriminator and quench voltage step-up circuit connected to receive the output signal of said superregenerative detector, the resonant frequency of said series-connected combination being such that said quench frequency lies on the steep section of the resonance curve of said combination; an electronic switch for turning said audio stage on and off;

and means for applying the amplified quench signal from said quench voltage step-up circuit to said electronic switch to turn said audio stage to an on condition and an off condition in response to shift in quench frequency occasioned by the presence and absence of said external signal and to maintain said audio stage in one of said two conditions during the entire interval when said external signal is absent.

7. A radio receiving system comprising an audio stage and a superregenerative detector adapted to receive an external signal; the detector circuit including a transistor having in the circuit between its base and emitter a resistor and, effectively in parallel therewith at the quench frequency, a capacitor forming a time constant circuit for causing the radio frequency oscillations in the detector to be interrupted at the quench frequency; effectively in parallel at the quench frequency with said capacitor, a series of combination of a capacitor and a variable resistor for adjusting the quench frequency; a series-connected capacitor and inductor serving as a combined frequency discriminator and quench voltage step-up circuit connected to receive the output signal of said superregenerative detector, the resonant frequency of said series-connected combination being such that the quench frequency lies on the steep section of the resonance curve thereof; an electronic switch for turning on and off said audio stage; means for rectifying and smoothing the amplified quench signal from said quench voltage step-up circuit; and means for applying the rectified, smoothed quench signal from said last mentioned means to said electronic switch to turn said audio stage on and off in response to shift in quench frequency occasioned by the presence and absence of said external signal.

8. The system of claim 7 wherein said electronic switch is a transistor and said rectified, smoothed quench signal is applied as a voltage between the base and emitter of said last mentioned transistor.

9. The system of claim 8 wherein the amplified quench signal is taken from across the inductor of said quench voltage step-up circuit.

10. A radio receiving system comprising an audio stage and a superregenerative detector adapted to receive an external signal; the detector circuit including an active device having an emitter, a collector and a control element; a circuit between the control element and the emitter comprising a resistor and, effectively in parallel therewith at the quench frequency, a capacitor forming a time constant circuit for causing the radio frequency oscillations in the detector to be interrupted at the quench frequency; effectively in parallel at the quench frequency with said capacitor, a series combination of a capacitor and a variable resistor for adjusting the quench frequency; a series-connected capacitor and inductor serving as a combined frequency discriminator and quench voltage step-up circuit connected to receive the output signal of said superregenerative detector, the resonant frequency of said series-connected combination being such that the quench frequency lies on the steep section of the resonance curve thereof; an active device for turning on and off said audio stage; means for rectifying and smoothing the amplified quench signal from said quench voltage step-up circuit; and means for applying the rectified, smoothed quench signal from said last mentioned means to said last mentioned active device to turn on and off said audio stage in response to shift in quench frequency occasioned by the presence and absence of said external signal.

11. The system of claim 10 wherein said last mentioned active device includes an emitter, a collector, and a control element, and wherein said rectified, smoothed quench signal is applied as a voltage between the emitter and the control element of said last mentioned active device.

12. The system of claim 11 wherein the amplified quench signal is taken off across the inductor of said quench voltage step-up circuit.

References Cited by the Examiner

UNITED STATES PATENTS

| | | | |
|---|---|---|---|
| 1,804,526 | 5/31 | Coxhead | 325—492 |
| 2,984,742 | 5/61 | Worcester | 325—492 |
| 2,992,327 | 7/61 | Lennon | 325—429 |

DAVID G. REDINBAUGH, *Primary Examiner.*